US007584113B2

(12) United States Patent
Denton et al.

(10) Patent No.: US 7,584,113 B2
(45) Date of Patent: Sep. 1, 2009

(54) METHOD FOR SIMULTANEOUSLY CONSIDERING CUSTOMER COMMIT DATES AND CUSTOMER REQUEST DATES

(75) Inventors: Brian T. Denton, Winooski, VT (US); Robert J. Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 10/707,973

(22) Filed: Jan. 29, 2004

(65) Prior Publication Data

US 2005/0171824 A1    Aug. 4, 2005

(51) Int. Cl.
*G05B 19/418* (2006.01)
(52) U.S. Cl. .......................................................... 705/8
(58) Field of Classification Search ...................... 705/8
See application file for complete search history.

(56) References Cited

U.S. PATENT DOCUMENTS

| 5,943,484 | A | * | 8/1999 | Milne et al. ................. 700/100 |
| 5,971,585 | A | | 10/1999 | Dangat et al. |
| 6,088,626 | A | | 7/2000 | Lilly et al. |
| 6,498,786 | B1 | | 12/2002 | Kirkby et al. |
| 6,898,472 | B2 | * | 5/2005 | Crampton et al. ............. 700/97 |
| 7,164,959 | B2 | * | 1/2007 | Huang et al. ................. 700/99 |

(Continued)

FOREIGN PATENT DOCUMENTS

EP        425405 A2 *  5/1991

OTHER PUBLICATIONS

Moodie, Douglas R. "Demand Management: The Evaluation of Price and Due Date Negotiation Strategies Using Simulation." Production and Operations Management, vol. 8, No. 2. (Summer 1999). pp. 151-162.*

(Continued)

*Primary Examiner*—Beth V Boswell
*Assistant Examiner*—Neil R Kardos
(74) *Attorney, Agent, or Firm*—Gibb I.P. Law Firm, LLC; Richard M. Kotulak, Esq.

(57) ABSTRACT

The invention disclosed here is a method for achieving simultaneous consideration of multiple customer demand dates within an advanced planning system. The invention provides a method of production planning that considers multiple due dates. The invention solves a production planning model based upon the second (commit) date to produce a first solution, sorts the demand records in order of importance, and then re-solves the production planning model based upon the first (request) date to produce a second solution. The re-solving process is performed on each demand item in the sorted order of importance. The invention optimizes between the first solution and the second solution. Before re-solving the production planning model, the invention changes the lower bound constraints on backorder variables. The re-solving process changes the required date for a single demand item, and this re-solving process is repeated for all demand items that have a first (request) date that is before a corresponding required date. The invention reports the optimal solution produced during the optimizing process. The system and method integrate the consideration of multiple demand dates with an advanced planning system for optimizing established planning objectives (e.g. customer service, short lead times, low inventory, and prioritized allocation of supply and capacity) to compute a feasible production plan for the division.

10 Claims, 5 Drawing Sheets

U.S. PATENT DOCUMENTS

| | | | |
|---|---|---|---|
| 7,444,295 | B2* | 10/2008 | Peachey-Kountz et al. ..... 705/8 |
| 2002/0133387 | A1 | 9/2002 | Wilson et al. |
| 2002/0188499 | A1 | 12/2002 | Jenkins et al. |
| 2002/0198757 | A1 | 12/2002 | Hedge et al. |
| 2003/0065415 | A1 | 4/2003 | Hegde et al. |
| 2003/0149631 | A1 | 8/2003 | Crampton et al. |
| 2003/0208392 | A1 | 11/2003 | Shekar et al. |
| 2005/0144056 | A1 | 6/2005 | Wang et al. |

OTHER PUBLICATIONS

Hegedus, Michael G. and Wallace J. Hopp. "Due date setting with supply constraints in systems using MRP" Computers & Industrial Engineering 39 (2001) pp. 293-305.*

Chen, Chien-Yu, et al. "Quantity and Due Date Quoting Available to Promise" Information Systems Frontiers 3:4 (2001) pp. 477-488.*

Wang, Dingwei, et al. "Soft Computing for Multicustomer Due-Date Bargaining" IEEE Transactions on Systems, Man, and Cybernetics—Part C: Applications and Reviews 29:4 (1999) pp. 566-575.*

Leachman et al., "IMPRESS: An Automated Production-Planning and Delivery-Quotation System at Harris Corporation-Semiconductor Sector", Interfaces vol. 26:1, pp. 6-37, 1996.

Nemhauser et al., Integer and Combinatorial Optimization, Chapter 2—Linear Programmig, pp. 27-41, 1999.

G. Dantzig, "Linear Progammign and Extensions", Princeton University Press, pp. 448-455, 1963.

Denton et al., U.S. Appl. No. 10/707,977, Office Action Communication, Mar. 18, 2009, 10 Pages.

Karabuk, et al. "Coordinating Strategic Capacity Planning in the Semiconductor Industry". Operations Research, vol. 51, No. 6, Nov./Dec. 2003, pp. 839-849.

Chen, H. et al., "A Lagrangian Relaxation Approach for Supply Chain Planning with Order/Setup Costs and Capacity Constraints". Journal of Systems Science and Systems Engineering, vol. 12, No. 1, pp. 98-110, Mar. 2003.

Chu, S. "A Mathematical Programming Approach Towards Optimized Master Production Scheduling", Int'l J. Of Production Economics, vol. 38, pp. 269-279.

Eksioglu, S. "Optimizing Integrated Production, Inventory and Distribution Problems in Supply Chains". A Dissertation, University of Florida, 2002.

George B. Dantzig, G.B., et al. "Decomposition Principle-for Linear Programs", Operations Research, vol. 8, No. 1 (Jan.-Feb. 1960), pp. 101-111.

Wang et al., "Earliness/Tardiness Production Planning Approaches with Due-Window for Manufacturing Systems." Computers in Industrial Engineering, 34:4 (1998), pp. 825-836.

Fang et al. "A Rolling Horizon Job Shop Rescheduling Strategy in the Dynamic Environment." International Journal of Advanced Manufacturing Technology, 13 (1997), pp. 227-232.

Potts et al., "Single Machine Scheduling to Minimize Total Late Work." Operations Research, 40:3 (1992), pp. 586-595.

Wang et al., "JIT Production Planning Approach with Fuzzy Due Date for OKP Manufacturing systems." International Journal of Production Economics, 58 (1999), pp. 209-215.

Denton et al. U.S. Appl. No. 10/707,974, Office Action Communication, Jan. 22, 2009, 13 pages.

* cited by examiner

METHOD FOR SIMULTANEOUSLY CONSIDERING CUSTOMER COMMIT DATES AND CUSTOMER REQUEST DATES

CROSS REFERENCE TO RELATED APPLICATIONS

The present application is related to pending U.S. patent application Ser. No. 10/707,978, filed concurrently herewith to Denton et al., entitled "A METHOD FOR SUPPLY CHAIN COMPRESSION"; U.S. patent application Ser. No. 10/707,974, filed concurrently herewith to Denton et al., entitled "METHOD FOR PURCHASE ORDER RESCHEDULING IN A LINEAR PROGRAM". U.S. patent application Ser. No. 10/707,977, filed concurrently herewith to Denton et al., entitled "A METHOD FOR SUPPLY CHAIN DECOMPOSITION" U.S. patent application Ser. No. 10/707,977, filed concurrently herewith to Denton et al., entitled "A METHOD FOR OPTIMIZING FOUNDRY CAPACITY"; U.S. patent application Ser. No. 10/707,972, filed concurrently herewith to Denton et al., entitled "METHOD FOR FAIR SHARING LIMITED RESOURCES BETWEEN MULTIPLE CUSTOMERS"; U.S. patent application Ser. No. 10/707,973, filed concurrently herewith to Denton et al., entitled "A METHOD FOR CONSIDERING HIERARCHICAL PREEMPTIVE DEMAND PRIORITIES IN A SUPPLY CHAIN OPTIMIZATION MODEL"; and U.S. patent application Ser. No. 10/708,119, filed concurrently herewith to Orzell et al., entitled "METHOD FOR IDENTIFYING PRODUCT ASSETS IN A SUPPLY CHAIN USED TO SATISFY MULTIPLE CUSTOMER DEMANDS". The foregoing applications are assigned to the present assignee, and are all incorporated herein by reference.

BACKGROUND OF INVENTION

1. Field of the Invention

The present invention relates to computer implementable decision support systems for determining optimal supply chain plans based on multiple demand date considerations. General methodologies within this field of study include advanced planning systems, optimization and heuristic based algorithms, constraint based programming, and simulation.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers" demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming.

The below-referenced U.S. patents disclose embodiments that were satisfactory for the purposes for which they were intended. The disclosures of both the below-referenced prior U.S. patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 5,943,484, "Advanced material requirements planning in microelectronics manufacturing," Aug. 24, 1999; and Nemhauser, G. L. and Wolsey, L. A., 1999, Wiley, Integer and Combinatorial Optimization.

SUMMARY OF INVENTION

The invention comprises a method of production planning that considers multiple demand dates. The invention performs production planning for both the customer request date and the customer commit date. The invention also performs a binning operation to represent the multiple demand dates with demand priorities. A decision of whether the customer request date will be honored can be based on an associated priority that may depend in part upon a customer's willingness to pay premium prices. The customer commit date has a higher priority than the customer request date and the customer request date and the customer commit date are associated with artificial part numbers that are based on the single part number. Thus, the invention provides a method for determining a supply chain plan that creates, from a single demand record, a plurality of distinct demand records. Each of the distinct demand record has a different demand date. The invention performs core processing to create the supply chain plan. This core processing considers all of the distinct demand records. Also, the invention selects one of the distinct demand records for supplying the single demand record, and this selecting process can be based at least in part upon pricing. For example, the selecting process can provide different prices for different demand dates.

In other words, the invention provides a method of production planning that considers multiple due dates for providing the same resource to the same demand item associated with an original part number. The multiple due dates can include (but are not limited to) for example, a first (request) date when the resource can be provided to the demand item, and a later second (commit) date when the resource must be provided to the demand item. The invention creates, from the original part number, a commit-date part number associated with providing the resource to the demand item by the second (commit) date and also creates, from the original part number, a request-date part number associated with providing the resource to the demand item by the first (request) date.

Then, the invention performs production planning for both the commit-date part number and the request-date part number to determine when the resource can be provided to the demand item. After this, the invention replaces the commit-date part number and the request-date part number with the original part number. The commit-date part number has a higher priority than the request-date part number. The invention reports to the demand item whether the resource will be supplied by the second (commit) date or the first (request) date. The invention uses duplicate binning records to separately supply the commit-date part number and the request-date part number.

The process of production planning simultaneously and separately processes objective functions and constraints for the commit-date part number from the request-date part number. The process of production planning simultaneously performs production planning for other resources and other demand items.

In another embodiment, the invention provides a method of production planning that considers multiple due dates. The invention solves a production planning model based upon the second (commit) date to produce a first solution, sorts the demand records in order of importance, and then re-solves the production planning model based upon the first (request) date to produce a second solution. The re-solving process is performed on each demand item in the sorted order of importance. The invention optimizes between the first solution and the second solution. Before re-solving the production planning model, the invention changes the lower bound constraints on backorder variables. The re-solving process changes the required date for a single demand item, and this re-solving process is repeated for all demand items that have a first (request) date that is before a corresponding required date. The invention reports the optimal solution produced during the optimizing process.

The present invention provides the capability to simultaneously consider both request and commit dates for at least one customer demand. In order to accomplish this, the invention introduces two "artificial" part numbers for each part for which it is desirable to distinguish between request and commit dates. One artificial part will have low priority demand with a target date set to the request date. The other artificial part will have normal priority demand with a target date set to the commit date. Compared with conventional systems, by simultaneously considering both request and commit dates for a single demand, this invention provides a more efficient allocation of assets and resources given the objective to provide excellent customer service.

DETAILED DESCRIPTION

Figure 1:
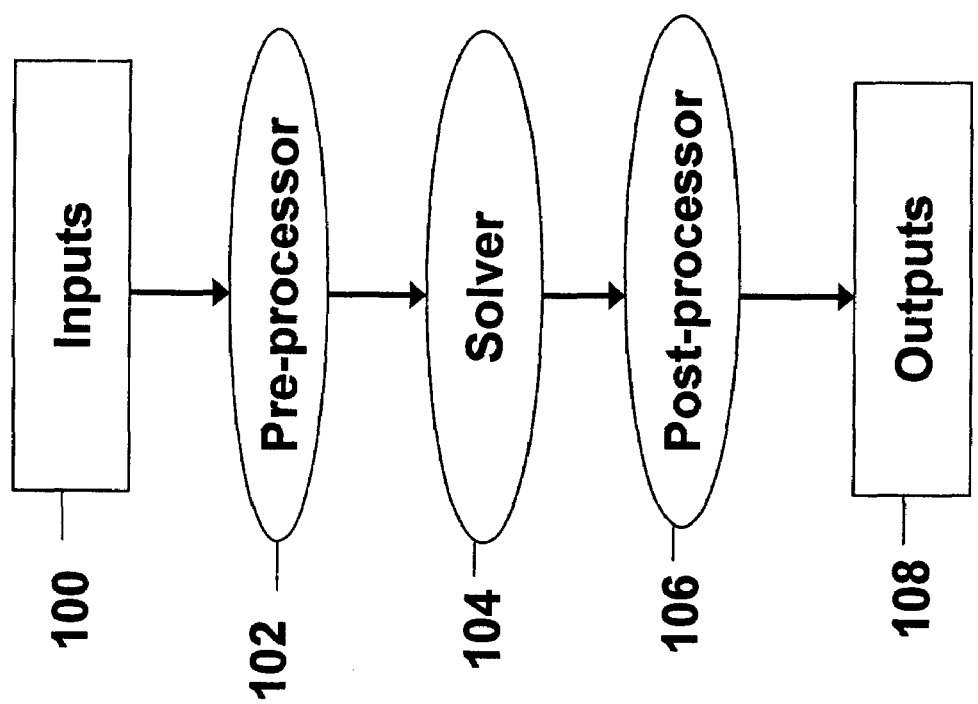
FIG. 1: Overview of the structure of a typical linear programming application.

Detailed Description of Preferred Embodiment(s) of the Invention The present invention provides the capability to simultaneously consider both request and commit dates for a single demand. This is done through the introduction of artificial part numbers where one artificial part satisfies the requested demand and the other the committed demand. To contrast the present invention, a conventional production planning linear program "LP" is shown below (such as that described in U.S. Pat. No. 5,971,585, which is incorporated herein by reference). This LP makes decisions including: production starts, material substitutions, and shipments planned to customers, between manufacturing and distribution locations, and from vendor suppliers. A LP is composed of an objective function that defines a measure of the quality of a given solution, and a set of linear constraints. The types of equations used in production planning models are well know to those practiced in the art and include: (1) Material Balance Constraints, which ensure conservation of material flow through the network of stocking points comprising the supply chain.

(2) Capacity Constraints, which ensure that the capacity available for manufacturing activities is not exceeded.

(3) Backorder Conservation Constraints, which balance the quantity of a given part backordered in a given planning period with the quantity backordered in the previous planning period and the net of new demand and new shipments.

(4) Sourcing Constraints, which define target ranges (minimum and maximum) of shipments that should be made from a particular manufacturing or vendor location in the supply chain.

A conventional LP formulation is provided below in the form familiar to those practiced in the art; i.e., definition of subscripts, definition of objective function coefficients, definition of constants, definition of decision variables, LP formulation or equations.

Definition of Subscripts j—time period m—material (part number)

a—plant location within the enterprise n—material being substituted z—group (which represents a family or collection of part numbers)

e—process (a method of purchasing or manufacturing a material at a plant) v receiving plant location k—demand center (i.e., customer location) (Note: the set of customer locations is mutually exclusive from the set of plant locations)

q—demand class which indicates relative priority w—resource capacity which could be a machine, labor hour, or other constraint u—represents a consumer location which refers to an internal plant, external demand center, or to a generic indicator meaning any plant/or demand center Definition of Objective Function Coefficients $PRC_{jmae}$—cost of releasing one piece of part m during period j at plant a using process e $SUBC_{jmna}$—substitution cost per piece of part number n which is being substituted by part number m during period j at plant a $TC_{jmav}$—transportation cost per piece of part number m leaving plant a during period j which are destined for plant v $INVC_{jma}$—inventory cost of holding one piece of part number m at the end of period j at a particular plant a $DMAXC_{jzau}$—cost per piece of exceeding the maximum amount of shipments of group z parts from plant a to consuming location(s) u during period j $DMINC_{jzau}$—cost per piece of falling short of the minimum amount of shipments specified for group z parts from plant a to consuming location(s) u during period j $BOC_{jmkq}$—backorder cost of one piece of part m at the end of period j for class q demand at customer location k Definition of Constants $DEMAND_{jmkq}$—demand requested during time period j for part number m at customer location k for demand class q $RECEIPT_{jma}$—quantity of projected wip and purchase order receipts for part number m expected to be received at plant a during time period j $CAPACITY_{jaw}$—Capacity of resource w available at plant a during period j to support production starts $CAPREQ_{jmaew}$—Capacity of resource w required for part number m at plant a for process e during period j $QTYPER_{jmaen}$—quantity of component m needed per part number n during period j at plant a using process e $YIELD_{jmae}$—output of part number m per piece released or started at plant a during time period j using process e $SUBQTY_{jmna}$—quantity of part number m required to substitute for one piece of part number n at plant a during time period j $MAXPCT_{jzau}$—maximum percentage of total shipments of group z (collection of parts) leaving supplier a during period j to support consumption at consuming location(s) u $MINPCT_{jzau}$—minimum percentage of total shipments of group z (collection of parts) leaving supplier a during period j to support consumption at consuming location(s) u $CT_{jmae}$—Cycle time. The number of periods between the release and completion of part m jobs for releases made using process e at plant a during time period j $TT_{mav}$—transport time for part number m from plant a to plant v Definition of LP Decision Variables $I_{jma}$—Inventory at the end of period j for part number m at a particular plant a $P_{jmae}$—Production starts of part m during period j at plant a using process e $L_{jmna}$—Quantity of part number n which is being substituted by part number m during period j at plant a $T_{jmav}$—Internal shipments of part number m leaving plant a during period j which are destined for plant v $F_{jmakq}$—Shipments of part number m leaving plant a during period j and satisfying class q demand at external customer k $B_{jmkq}$—Back orders of part m at the end of period j for class q demand at customer location k $H_{jzu}$—Total shipments of group z (z is a "collection" of parts) leaving suppliers during period j to support consumption at consuming location(s) u $S_{jzau}$—Amount by which total shipments of parts in z from plant a to consuming location(s) u during period j exceeds the maximum amount specified as desired in the sourcing rules $G_{jzau}$—Amount by which total shipments of group z parts from plant a to consuming location(s) u during period j falls short of the minimum amount specified as desired in the sourcing rules LP Equations or Formulation The following minimizes the objective function subject to the constraints shown below.

Objective Function:

Minimize:

$$\sum_j \sum_m \sum_a \sum_e PRC_{jmae} P_{jmae} +$$

$$\sum_j \sum_m \sum_n \sum_a SUBC_{jmna} L_{jmna} + \sum_j \sum_m \sum_a \sum_v TC_{jmav} T_{jmav} +$$

$$\sum_j \sum_m \sum_a INVC_{jma} I_{jma} + \sum_j \sum_z \sum_a \sum_u DMAXC_{jzau} S_{jzau} +$$

$$\sum_j \sum_z \sum_a \sum_u DMINC_{jzau} G_{jzau} + \sum_j \sum_m \sum_k \sum_q BOC_{jmkq} B_{jmkq}$$

Subject to:

Sourcing Constraints:

$$H_{jzu} = \sum_{\substack{m \\ \varepsilon z}} \sum_a \left( T_{jmau} + \sum_q F_{jmauq} \right)$$

$$\sum_{\substack{m \\ \varepsilon z}} \left( T_{jmau} + \sum_q F_{jmauq} \right) - S_{jzau} \leq MAXPCT_{jzau} H_{jzu}$$

$$\sum_{\substack{m \\ \varepsilon z}} \left( T_{jmau} + \sum_q F_{jmauq} \right) + G_{jzau} \geq MINPCT_{jzau} H_{jzu}$$

Capacity Constraints:

$$\sum_m \sum_e CAPREQ_{jmaew} P_{jmae} \leq CAPACITY_{jaw}$$

Backorder Constraints:

$$B_{jmkq} = B_{(j-1)mkq} + DEMAND_{jmkq} - \sum_a F_{jmakq}$$

Material Balance Constraints:

$$I_{jma} = I_{(j-1)ma} + RECEIPT_{jma} + \sum_{\substack{xsi,t \\ x+CT_{xmae}=j}} \sum_e YIELD_{xmae} * P_{xmae} +$$

$$\sum_n L_{jmna} + \sum_{\substack{xs,t \\ x+TT_{mav}=j}} \sum_v T_{xmva} - \sum_n SUBQTY_{jmna} * L_{jmna} -$$

$$\sum_v T_{jmav} - \sum_k \sum_q F_{jmakq} - \sum_{\substack{nst,m \\ \text{is a component} \\ \text{of } n}} \sum_e QTYPER_{jmaen} P_{jnae}$$

Non-Negativity Constraints:

all $X_{i,j\ldots} \geq 0$, where X is a generic decision variable and i, j etc. represent generic subscripts The supply chain linear programming model shown above only allows for consideration of a single customer demand date. Typically, a user will provide demand as input based on the customer "commit" date, even though this commit date may be later than a customer's original "request" date. The present invention allows for consideration of multiple dates, for example, attempting to guarantee meeting a customer commit date while at the same time attempting to achieve the customer's original request date, if possible.

Conventional advanced planning systems attempt to satisfy each demand on a given date. This date may be the commit date for a committed customer order, a request date for a new order, or an expected date for a forecasted demand, as examples. However, manufacturers have encountered situations where it is desirable to consider multiple dates. By way of example, suppose that in September, a manufacturer commits to satisfying a particular demand on March 31$^{st}$ of the following year and that this date is later than the customer's original request date of March 1$^{st}$ (perhaps due to a manufacturing capacity shortage). Typically, the manufacturer's customer would adjust its plans under the assumptions that their delivery would not be shipped until March 31$^{st}$. However, sometimes the customer does not adjust its plans and rather prefers to see if the manufacturer can do better in November. For the November run, it would be desirable to consider both the commit date of the demand (March 31$^{st}$) and the desired request date of the demand (say March 1$^{st}$). Given the limited nature of assets and capacity throughout the supply chain, the manufacturer should try to satisfy the demand by March 1$^{st}$ but attempt to guarantee satisfaction of the demand by its commit date (March 31$^{st}$).

Conventional advanced planning systems require the demand to be entered with either March 1$^{st}$ or March 31$^{st}$ as the demand's target date. However, it is desirable to have a single planning method consider both dates simultaneously with different priorities. So doing can lead to a more efficient allocation of assets and resources and substantially improved customer service metrics. The present invention provides this simultaneous date consideration within a linear programming based advanced planning system. However, it will be understood by those practiced in the art that the invention may also be applied to advanced planning systems that are not based on linear programming (e.g. nonlinear programming, heuristics). Further, although presented below as an invention which considers two dates (request and commit), it should also be understood that it is straightforward to extend the invention to consider more than two dates.

Linear programming applications typically include the transformation of input files (block 100) into output files (block 108) through a pre-processor (block 102), solver (block 104), and post-processor (block 106) as shown in FIG. 1. The pre-processor (block 102) transforms the raw input files into a format useable by the linear programming solver. The solver (block 104) determines an optimal raw output solution which is transformed by the post-processor (block 106) into a format acceptable for usage. The present invention is embedded in the second and fourth stages (blocks 102 and 106 respectively) and is used to achieve solutions based on consideration of multiple customer demand dates. Although the embodiment is described in a context where the solver is a linear program, those skilled in the art will recognize that any Advanced Planning System (APS) could be used as the solver including a heuristic based APS.

Subsequent to solution generation, post-processing (block 106) is completed to strip out the artificial part numbers and thus present comprehensible output to the user. Compared with conventional systems, by simultaneously considering both request and commit dates for a single demand, this invention provides a more efficient allocation of assets and resources given the objective to provide excellent customer service.

Figure 2:
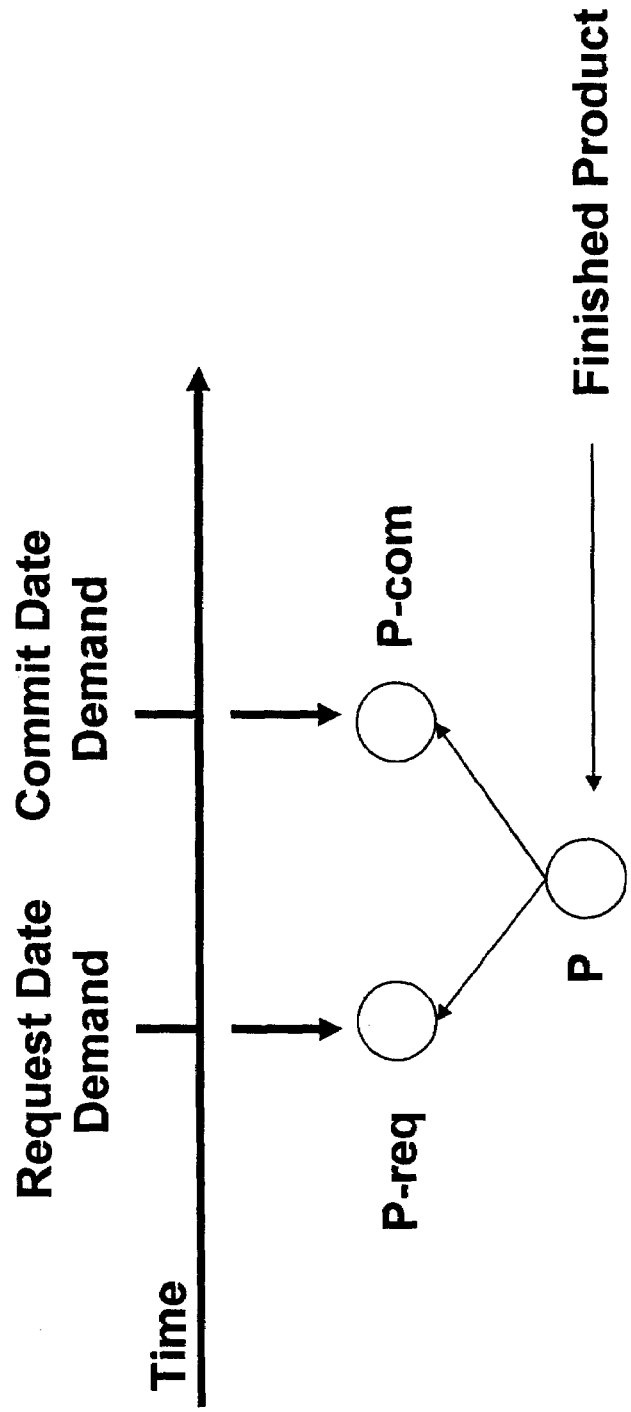
FIG. 2: Illustration of demand splitting in which there is a customer request date and a customer commit date.
Figure 3:
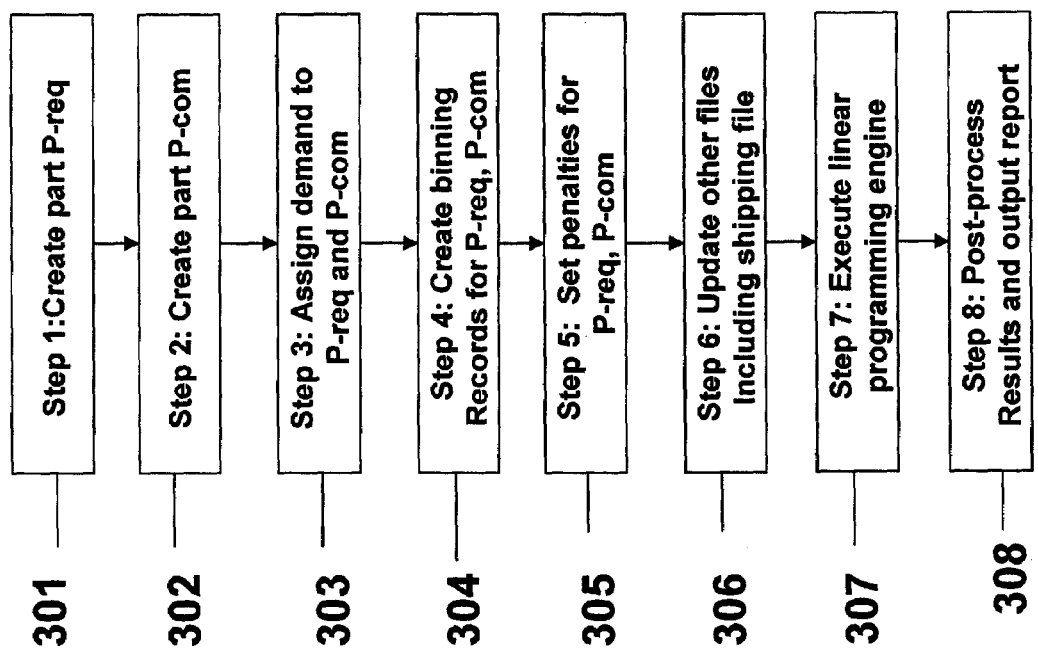
FIG. 3: Steps of the method for determining a supply chain plan based on consideration of multiple demand dates.

FIG. 3 provides an illustration of the flow of the major steps described below for each part number. FIG. 2 is a graphical illustration of the example used to illustrate the method. Below is a summary of the salient steps of the algorithm based on the example in FIG. 2. For each part number, P, for which we want to distinguish commit dates versus request dates, execute the below items 301-306. In item 301 the invention creates a new part number, P-req, which will satisfy the requested demand. In item 302 create a new part number, P-com, which will satisfy the committed demand. In item 303 the invention assigns P's demand to P-req and P-com providing P-com with the commit date and P-req with the request date. The priority of P-req's demand will be low and the priority of P-com's demand will be slightly lower than the original priority. These priorities should be set so that the corresponding objective function cost penalty of backordering the original demand priority should be equal to the penalty of backordering the P-req demand plus the penalty of backordering the P-com demand. The total of the backorder penalties is set equal to that of the original backorder penalty because in the event of the LP not being able to satisfy the demand by the commit date, the resulting backorder penalty should be the same as that of any other demand with commit date of the same priority. In other words, once the business is unable to satisfy the demand by the commit date, whether or not the customer requests or prefers it to be delivered earlier doesn't really matter at this point. The penalty of backordering P-req demand is relatively low compared with the penalty of backordering P-com demand because satisfying the demand by the request date is not nearly as important as satisfying demands by their commit dates. Those skilled in the art will recognize that other backorder penalty values could be used in lieu of those described in this preferred embodiment. If any demands have request dates later than commit dates, then the invention pushes the commit dates out to the request dates.

In item 304, the invention creates binning records so that part P bins to parts P-req and P-com, each with 100%. This effectively doubles the supply quantity, which balances the previous step's doubling of the demand quantity. In item 305, the invention sets penalties for P-req and P-com as follows. The cost of shipping the artificial parts should be equal and total to be the same as the original cost of shipping part P to its respective customer locations, and the processing cost of each artificial part should be set to an arbitrary very low default value. The inventory cost of P-req should be set relatively high and for P-com set to zero. The relatively high inventory cost of P-req (at least as high as or very slightly higher than the original inventory cost of part P) discourages the early production and storage of P-req for which there is no business purpose. The appropriateness of zero inventory cost for P-com is explained as follows. Suppose that the business is able to deliver P by the request date and, from the LP's viewpoint, ship the part P-req at that time. This would result in inventory of part P-com between the request date and the commit date (since the backorder equations prevent early shipments). This temporary inventory at P-com in this situation is desirable because it allows the shipment on the customer's request date. This does not mean that there is inventory from a business standpoint but rather that there is inventory on the artificial P-com part which does not exist in the real world. Those skilled in the art will recognize that other penalty settings may be desirable depending upon the business objectives and policies of the organization using the invention.

In item 306, the invention updates other necessary input files (such as the file of permissible shipments) and in item 307 the invention executes linear programming engine. In item 308 the invention post-processes the output to strip out the artificial part numbers P-req and P-com and re-institute the original part number P. The final customer shipments for part P are set to the customer shipments for P-req. On a cumulative basis, the customer shipments from P-req will always meet or exceed the customer shipments from P-com. Finally, output a report indicating which DEM records were honored at an earlier date than the commit date.

The invention includes an alternative method which can be used to achieve similar results through different methodology. In the alternate method a post-processing algorithm is used to sequentially modify the LP model, one demand record at a time, to determine if the demand record could be moved into an earlier date without substantially adjusting the production plan. In this method no adjustment is made to the data inputs, for example, binning or demand data. This alternative method is embedded within block 104 of FIG. 1.

Figure 4:
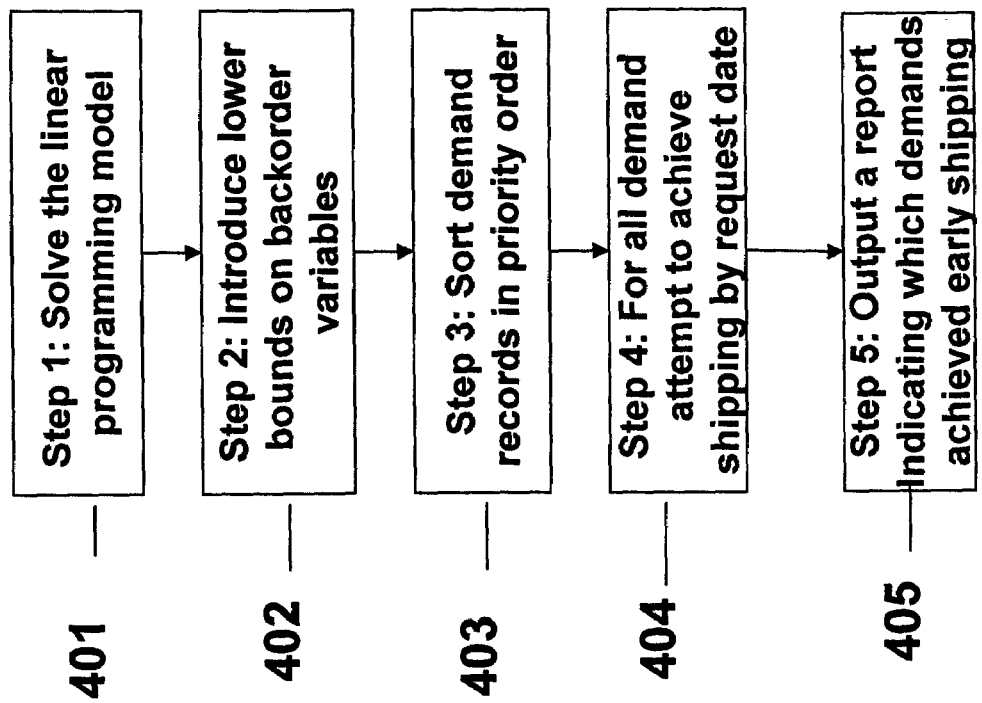
FIG. 4: Steps of an alternate method for determining a supply chain plan based on consideration of multiple demand dates.

More specifically, FIG. 4 illustrates the flow of the major items of this alternative method. In item 401, the invention solves an instance of the model (where demand is initialized based on commit date) and maintains the model and solution in memory for subsequent recalculations. Next, in item 402, the invention introduces lower bound constraints on all backorder ("B") variables based on the current value of the backorder variable. This introduction of lower bounds freezes the current production plan with respect to customer shipments that have been satisfied in the current solution. Then, the invention sorts demand records from most to least important in the demand file DEM in item 403.

In item 404, for each record in DEM which has a request date earlier than its commit date, the invention:

a) Finds the Backorder Constraint (BO) corresponding to the current demand record and subtracts the demand quantity for the current record from the right hand side of the BO constraint. This is the first step in moving the current demand record to an earlier date.

b) Removes lower bounds (introduced in Item 402) for all Backorder variables corresponding to the PN, Customer, and demand class associated with the current DEM record for periods >= requested demand date and < commit date. This is done to allow adjustments to BO constraints to be accommodated since moving the current DEM record to an earlier date necessitates adjustments to BO constraints.

c) Adds the demand quantity to the right hand side of the BO constraints corresponding to the request date. This represents the act of moving the current DEM record to the request date.

d) Updates the optimal solution to the LP model using the dual simplex (prior art) method based on adjustments to the DEM record and BO constraints in steps a-c.

e) Reintroduces lower bounds that were removed in substep (b), where the new lower bound is set to the current value of the "B" variables. In other words, the current solution (obtained through steps a-e) is set as the new baseline.

f) Records the period(s) in which the demand was shipped to the customer according to the updated optimal solution for reporting in Item 405.

In item 405, the invention produces an output report indicating for which DEM records early shipping was achieved in order to better accommodate the requested demand date.

These two alternative methods described above (FIGS. 3 and 4) are related but have tradeoffs. For instance, the first method (FIG. 3) may be somewhat more computationally demanding than the second method because of resulting increases in model size due to the addition of extra variables to model. On the other hand, the second method (FIG. 4) assumes "preemptive" priorities by choosing a specific sequence of demand records, whereas the first method (FIG. 3) allows for consideration of all demand request and commit dates all at once which can be traded off against each other based on how model cost parameters are calibrated. Although the above methods are described in the context of request and commit dates it will be understood by those practiced in the art that the invention could be extended to consider more than two dates.

Figure 5:
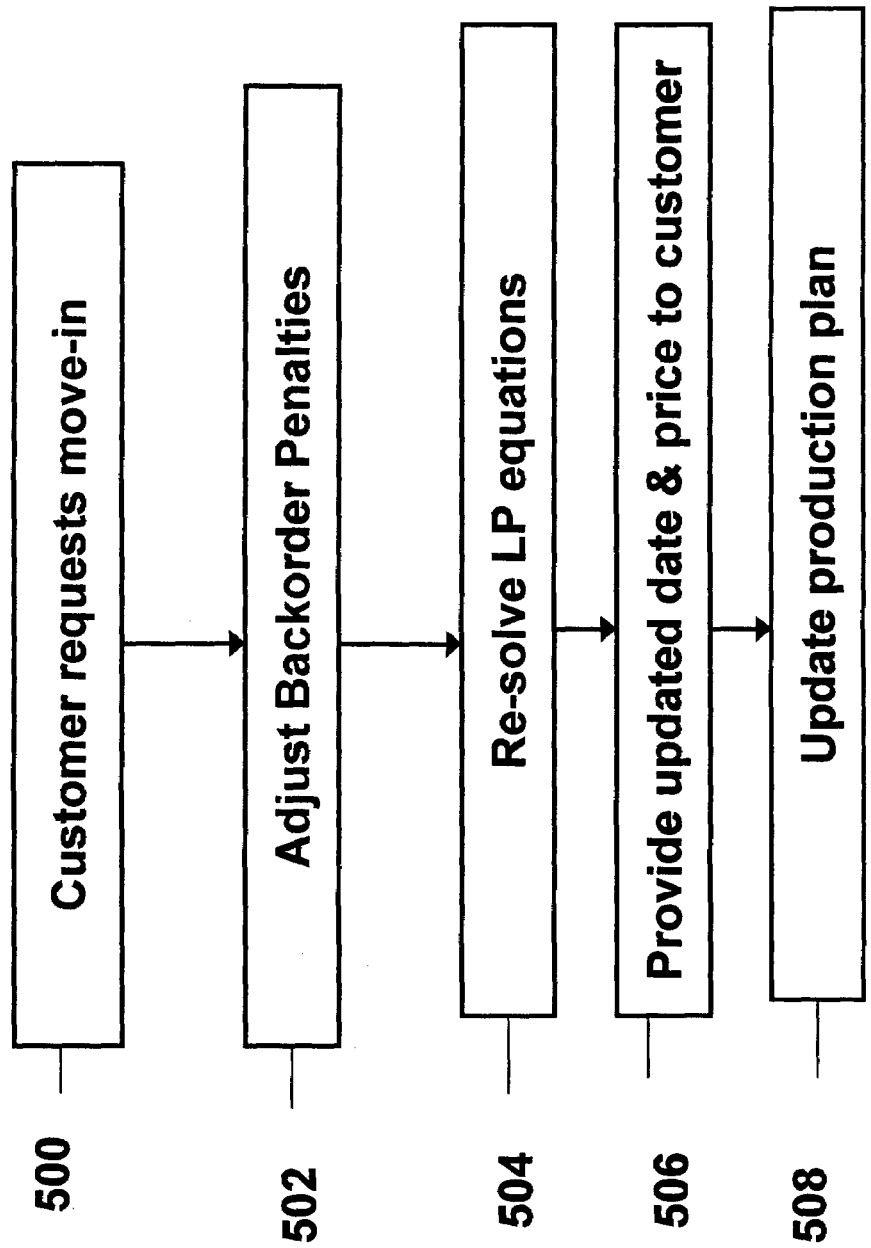
FIG. 5: Steps of the method for providing an earlier delivery date based upon the customer paying a higher price for early delivery.

One way to extend the above concepts is illustrated in FIG. 5. Suppose that subsequent to the creation of an initial production plan using normal prices and costs, a customer indicates that it is interested in the possibility of paying an additional fee in order to receive a delivery closer to the original request date. In block 500, the customer requests more information from the supplier as to this possibility. In block 502, the supplier tentatively assumes that the customer will be willing to pay more for the early delivery and increases the backorder penalty relevant to that delivery. The amount of increase to this penalty depends upon the additional price that the supplier will charge. It is possible to execute this method multiple times with various penalties associated with various price increases. The magnitude of the price increase influences the manufacturing supplier's willingness to give this block 500 request a higher priority than its other demands.

In block 504, the linear programming equations are resolved with the higher backorder penalties. The resulting supply date (and corresponding price increase) is presented in block 506 to the customer for its consideration. In block 508, the customer indicates whether or not it is willing to pay for the earlier delivery date. If the customer is willing to pay the price, then the supplier will update its production plan accordingly. As implied earlier, this mechanism can be used multiple times to provide the customer with multiple price and delivery time combination alternatives.

A further extension would be to institute the concepts of FIG. 5 proactively prior to an explicit (block 500) request from the customer. In this extension, the supplier does not wait for an explicit customer request, but rather acts as if the customer is already interested in the possibility of earlier delivery at a premium price. In this instance, the supplier essentially executes the steps of FIG. 5 for each situation where the original request is not delivered when requested at normal pricing. Customers are then presented with alternative delivery dates and prices for their consideration.

The present invention could be implemented on an IBM P690 server using the AIX operating system. The steps for implementing the present invention are preferably programmed in C/C++. It should be understood by those of ordinary skill in the art, however, that the represent invention is not limited to the above implementation and is independent of the computer/system architecture. Accordingly, the present invention may equally be implemented on other computing platforms, programming languages and operating systems, and also may be hardwired into a circuit or other computational component.

As shown above, the present invention provides the capability to simultaneously consider both request and commit dates for at least one customer demand. In order to accomplish this, the invention introduces two artificial part numbers for each part for which it is desirable to distinguish between request and commit dates. One artificial part will have low priority demand with a target date set to the request date. The other artificial part will have normal priority demand with a target date set to the commit date. Compared with conventional systems, by simultaneously considering both request and commit dates for a single demand, this invention provides a more efficient allocation of assets and resources given the objective to provide excellent customer service.

While the invention has been described in terms of the preferred embodiments, those skilled in the art will recognize that the invention can be practiced with modification within the spirit and scope of the appended claims.

The invention claimed is:

1. A computer-implemented method for determining a supply chain plan comprising:

receiving, by a computer, an original demand record for a demand for a product having an original part number, said original demand record having multiple different demand dates for shipping said product, said different demand dates comprising a first demand date and a second demand date later than said first demand date;

creating, by said computer, from said original demand record, a plurality of distinct demand records for said demand, wherein each of said distinct demand records has only one of said different demand dates, said creating of said plurality of distinct demand records comprising:
  creating a first artificial part number for satisfying said first demand date and a second artificial part number for satisfying said second demand date;
  assigning said demand for said product to said first artificial part number and to said second artificial part number;
  associating different priorities with said first artificial part number and said second artificial part number, said different priorities comprising a first priority for said first artificial part number and a second priority for said second artificial part number, said second priority being relatively higher than said first priority;
  associating different penalties with said first artificial part number and said second artificial part number;
  creating distinct binning records for said first artificial part number and said second artificial part number so that said original part number references both said first artificial part number and said second artificial part number;
performing, by said computer, core processing that considers each one of said distinct demand records having only one of said different demand dates, including considering said first artificial part number, said second artificial part number, said different priorities, and said different penalties;
selecting, by said computer, one of said distinct demand records for supplying said demand based on said core processing and re-instituting, by said computer, said original part number to replace said first artificial part number and said second artificial part number; and
outputting, by said computer, a supply chain plan based on results of said core processing, said supply chain plan indicating which of said distinct demand records were selected.

2. The method of claim 1, wherein selecting one of said distinct demand records for supplying said original demand record is based at least in part upon pricing.

3. The method of claim 1, wherein said different demand dates comprise a commit date and a request date.

4. The method of claim 1, wherein said core processing comprises linear programming.

5. The method of claim 1, wherein said different penalties comprise at least:
  a first backorder penalty for said first artificial part number and a second backorder penalty for said second artificial part number, wherein said first backorder penalty is relatively low compared to said second backorder penalty and wherein the sum of said first backorder penalty and said second backorder penalty equals an original backorder penalty for said demand for said product; and
  a first inventory cost for said first artificial part number and a second inventory cost for said second artificial part number, wherein said first new inventory cost is set to be at least as high as an original inventory cost for said demand for said product and said second new inventory cost is set to zero.

6. A computer-implemented method for determining a supply chain plan comprising:
  receiving, by a computer, an original demand record for a demand for a product having an original part number, said original demand record having multiple different demand dates for shipping said product, said different demand dates comprising a first demand date and a second demand date later than said first demand date;
  creating, by said computer, from said original demand record, a plurality of distinct demand records for said demand, wherein each of said distinct demand records has only one of said different demand dates, said creating of said plurality of distinct demand records comprising:
    creating a first artificial part number for satisfying said first demand date and a second artificial part number for satisfying said second demand date;
    assigning said demand for said product to said first artificial part number and to said second artificial part number;
    associating different priorities with said first artificial part number and said second artificial part number, said different priorities comprising a first priority for said first artificial part number and a second priority for said second artificial part number, said second priority being relatively higher than said first priority;
    associating different penalties with said first artificial part number and said second artificial part number;
    creating distinct binning records for said first artificial part number and said second artificial part number so that said original part number references both said first artificial part number and said second artificial part number;
  performing, by said computer, core processing that considers each one of said distinct demand records having only one of said different demand dates, including considering said first artificial part number, said second artificial part number, said different priorities, and said different penalties;
  selecting, by said computer, one of said distinct demand records for supplying said demand based on said core processing and re-instituting, by said computer, said original part number to replace said first artificial part number and said second artificial part number, wherein said selecting process is based at least in part upon pricing; and
  outputting, by said computer, a supply chain plan based on results of said core processing, said supply chain plan indicating which of said distinct demand records were selected.

7. The method of claim 6, wherein said selecting process is based upon different prices for different demand dates.

8. The method of claim 6, wherein said different demand dates comprise a commit date and a request date.

9. The method of claim 6, wherein said core processing comprises linear programming.

10. The method of claim 6, wherein said different penalties comprise at least:
  a first backorder penalty for said first artificial part number and a second backorder penalty for said second artificial part number, wherein said first backorder penalty is relatively low compared to said second backorder penalty and wherein the sum of said first backorder penalty and said second backorder penalty equals an original backorder penalty for said demand for said product; and
  a first inventory cost for said first artificial part number and a second inventory cost for said second artificial part number, wherein said first new inventory cost is set to be at least as high as an original inventory cost for said demand for said product and said second new inventory cost is set to zero.

* * * * *

UNITED STATES PATENT AND TRADEMARK OFFICE
CERTIFICATE OF CORRECTION

PATENT NO. : 7,584,113 B2 Page 1 of 1
APPLICATION NO. : 10/707973
DATED : September 1, 2009
INVENTOR(S) : Denton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1370 days.

Signed and Sealed this

Fourteenth Day of September, 2010

David J. Kappos
*Director of the United States Patent and Trademark Office*